US008489529B2

(12) United States Patent
Deng et al.

(10) Patent No.: US 8,489,529 B2
(45) Date of Patent: Jul. 16, 2013

(54) DEEP CONVEX NETWORK WITH JOINT USE OF NONLINEAR RANDOM PROJECTION, RESTRICTED BOLTZMANN MACHINE AND BATCH-BASED PARALLELIZABLE OPTIMIZATION

(75) Inventors: Li Deng, Redmond, WA (US); Dong Yu, Kirkland, WA (US); Alejandro Acero, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 291 days.

(21) Appl. No.: 13/077,978

(22) Filed: Mar. 31, 2011

(65) Prior Publication Data

US 2012/0254086 A1    Oct. 4, 2012

(51) Int. Cl.
*G06N 5/00* (2006.01)

(52) U.S. Cl.
USPC ............................................. 706/25; 706/45

(58) Field of Classification Search
USPC ...................................... 706/25, 45
See application file for complete search history.

(56) References Cited

U.S. PATENT DOCUMENTS

| | | | |
|---|---|---|---|
| 5,226,092 | A | 7/1993 | Chen |
| 5,479,579 | A | 12/1995 | Duong et al. |
| 5,572,028 | A | 11/1996 | Moscovitch et al. |
| 7,233,931 | B2 | 6/2007 | Lee et al. |
| 7,308,134 | B2 | 12/2007 | Wersing et al. |
| 2009/0204558 | A1 | 8/2009 | Weston et al. |
| 2009/0290800 | A1 | 11/2009 | Lo |

OTHER PUBLICATIONS

El Baz, Distributed asynchronous gradient algorithms for convex network flow problems, Proceedings of the 31st IEEE Conference on Decision and Control, 1992, pp. 1638-1642.*
Bertsekas, et al., Epsilon—Relaxation and Auction Methods for Seperable Convex Cost Network Flow Problems, Network Optimization, Pardalos, P. M., Hearn, D. W., and Hager, W. W. (eds.), Lecture Notes in Economics and Mathematical Systems, Springer-Verlag, N.Y., 1998, pp. 103-126.*
Hinton, et al., "A Fast Learning Algorithm for Deep Belief Nets", Retrieved at<<http://learning.cs.toronto.edu/~hinton/absps/fastnc.pdf>>, Journal Neural Computation vol. 18 Issue 7, Jul. 2006, pp. 1-16.

* cited by examiner

*Primary Examiner* — Wilbert L Starks (57) ABSTRACT

A method is disclosed herein that includes an act of causing a processor to access a deep-structured, layered or hierarchical model, called deep convex network, retained in a computer-readable medium, wherein the deep-structured model comprises a plurality of layers with weights assigned thereto. This layered model can produce the output serving as the scores to combine with transition probabilities between states in a hidden Markov model and language model scores to form a full speech recognizer. The method makes joint use of nonlinear random projections and RBM weights, and it stacks a lower module's output with the raw data to establish its immediately higher module. Batch-based, convex optimization is performed to learn a portion of the deep convex network's weights, rendering it appropriate for parallel computation to accomplish the training. The method can further include the act of jointly substantially optimizing the weights, the transition probabilities, and the language model scores of the deep-structured model using the optimization criterion based on a sequence rather than a set of unrelated frames.

20 Claims, 7 Drawing Sheets

DEEP CONVEX NETWORK WITH JOINT USE OF NONLINEAR RANDOM PROJECTION, RESTRICTED BOLTZMANN MACHINE AND BATCH-BASED PARALLELIZABLE OPTIMIZATION

BACKGROUND

Speech recognition has been the subject of a significant amount of research and commercial development. For example, speech recognition systems have been incorporated into mobile telephones, desktop computers, automobiles, and the like in order to provide a particular response to speech input provided by a user. For instance, in a mobile telephone equipped with speech recognition technology, a user can speak a name of a contact listed in the mobile telephone and the mobile telephone can initiate a call to the contact. Furthermore, many companies are currently using speech recognition technology to aid customers in connection with identifying employees of a company, identifying problems with a product or service, etc.

Research in automatic speech recognition (ASR) has explored layered architectures to perform speech recognition, motivated partly by the desire to capitalize on some analogous properties in the human speech generation and perception systems. In these studies, learning of model parameters has been one of the most prominent and difficult problems. In parallel with the development in ASR research, recent progresses made in learning methods from neural network research has ignited interest in exploration of deep-structured models. One particular advance is the development of effective learning techniques for deep belief networks (DBNs), which are densely connected, directed belief networks with many hidden layers. In general, DBNs can be considered as a highly complex nonlinear feature extractor with a plurality of layers of hidden units and at least one layer of visible units, where each layer of hidden units learns to represent features that capture higher order correlations in original input data.

While DBNs have been shown to be powerful in connection with performing recognition/classification tasks, training DBNs has proven to be somewhat difficult. In particular, conventional techniques for training DBNs involve the utilization of a stochastic gradient descent learning algorithm. While this learning algorithm has been shown to be powerful in connection with fine-tuning weights assigned to a DBN, such learning algorithm is extremely difficult to parallelize across machines, causing learning to be somewhat tedious.

SUMMARY

The following is a brief summary of subject matter that is described in greater detail herein. This summary is not intended to be limiting as to the scope of the claims.

Described herein are various technologies pertaining to automatic classification. With more specificity, described herein are various technologies pertaining to automatic speech recognition (ASR) and automatic character recognition. With still more specificity, described herein are various technologies pertaining to training a deep convex network through utilization of convex optimization.

A deep convex network includes a plurality of layered modules, wherein each module includes a specialized neural network that includes a single hidden layer. More particularly, a lowest module in the deep convex network comprises a first linear layer that includes a plurality of linear input units, a non-linear layer that comprises a plurality of non-linear hidden units, and a second linear layer that includes a plurality of linear output units produced by feeding raw training data into the module. For instance, if the deep convex network is utilized in connection with analyzing an image, the plurality of input units can correspond to a number of pixels (or the extracted features) in the image, and can be assigned values based at least in part upon intensity values, RGB values, or the like corresponding to the respective pixels. In another example, if the deep convex network is utilized in connection with ASR, the plurality of input units may correspond to samples of an audio file, wherein values assigned to the input units are based upon characteristics of the respective samples, or correspond to the extracted features from speech waveforms, such as power spectra or cepstral coefficients.

The hidden layer of the lowest module comprises a plurality of non-linear units that are mapped to the input units by way of a first weight matrix. For instance, the weight matrix may comprise a plurality of randomly generated values between 0 and 1. The non-linear units may be sigmoidal units that are configured to perform non-linear operations on weighted outputs from the input units (weighted in accordance with the first weight matrix).

The second linear layer includes the plurality of output units that are representative of targets of the classification task. For instance, if the deep convex network is configured to perform digit recognition in either a form of an image or a form of speech (e.g., the digits 1-10), then the plurality of output units may be representative of the values 1, 2, 3, and so forth up to 10. Similarly, if the deep convex network is configured to perform phone recognition, or more generally, large vocabulary speech recognition, then the plurality of output units may be representative of mono-phones, context-dependent phones or phone states. The plurality of non-linear units may be mapped to the plurality of output units by way of a second weight matrix. This second weight matrix can be learned by way of a batch-based learning process, such that learning can be undertaken in parallel. In particular, convex optimization can be employed in connection with learning the second weight matrix. As an example, the second weight matrix can be learned based at least in part upon the first weight matrix, the target values of the classification, and values of the input units.

As indicated above, the deep convex network includes a plurality of layered modules, wherein each module includes the aforementioned three layers (a first linear layer that includes a plurality of linear input units, a hidden layer that comprises a plurality of non-linear units, and a second linear layer that comprises a plurality of linear output units). The modules are referred to herein as being layered, as output units of a lower module are a subset of the input units of an adjacent higher module in the deep convex network. More specifically, in a second module that is directly above the lowest module in the deep convex network, the input units can include the output units of the lowest module. The input units can additionally include the input units that correspond to the raw training data—in other words, the output units of the lowest module can be appended to the input units in the second module, such that the input units of the second module also include the output units of the lowest module.

The input units in the second module corresponding to the raw training data can be mapped to the plurality of hidden units by the first weight matrix as described above. The input units in the second module that are the output units of the lowest module can be mapped to the plurality of hidden units by a third weight matrix, wherein such weights can be learned in a pre-training phase. Thereafter, the aforementioned second weight matrix (that describes weights of connections between the hidden units and the linear output units of the second module) can be again learned by way of convex optimization. This pattern of including output units in a lower module as a portion of the input units in an adjacently higher module in the deep convex network and thereafter learning a weight matrix that describes connection weights between hidden units and linear output units via convex optimization can continue for many modules (e.g., tens to hundreds of modules). A resultant learned deep convex network may then be deployed in connection with an automatic classification/identification task.

Other aspects will be appreciated upon reading and understanding the attached figures and description.

DETAILED DESCRIPTION

Various technologies pertaining to deep convex networks (DCNs) will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components, and some steps in methodologies described herein may be omitted, re-ordered, or combined.

Figure 1:
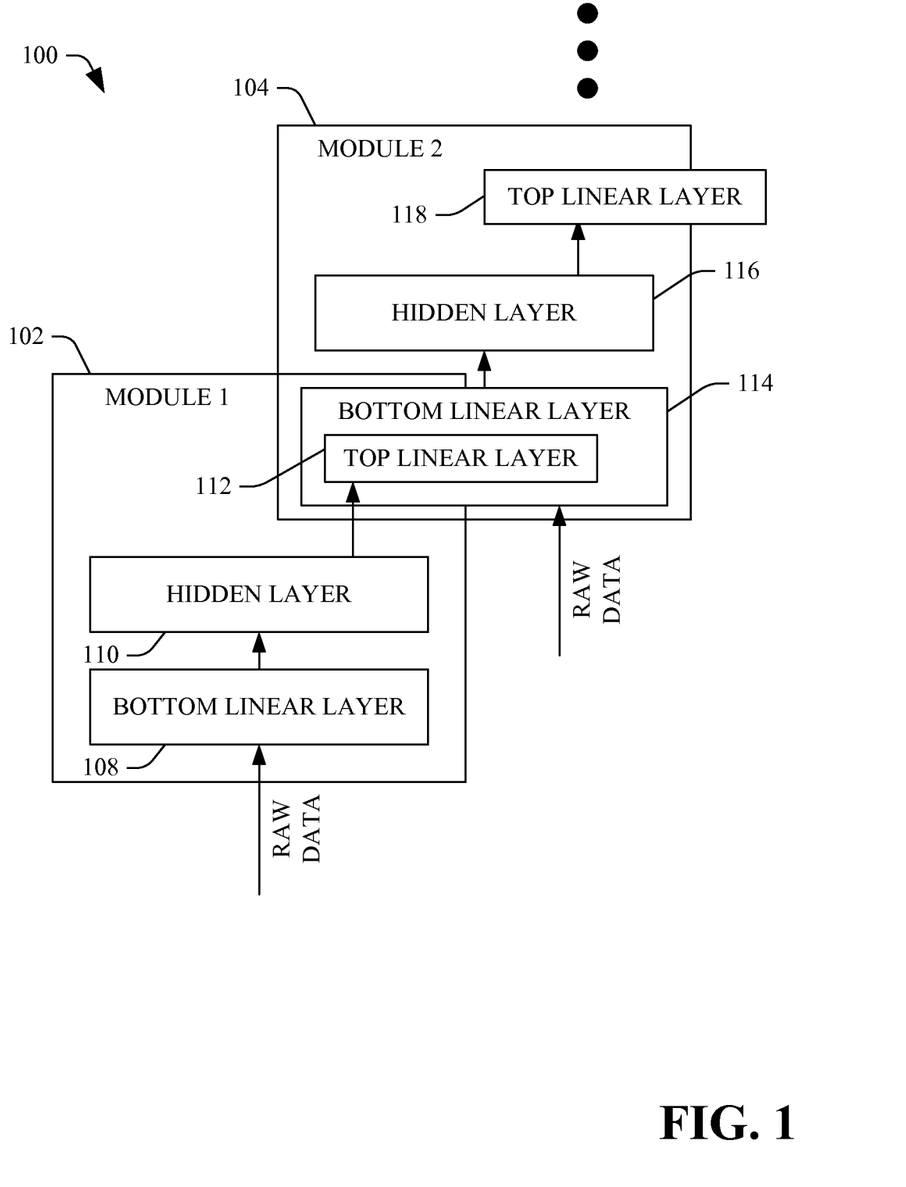
FIG. 1 illustrates an exemplary deep convex network that comprises a plurality of layered modules.

With reference to FIG. 1, an exemplary DCN 100 is illustrated, wherein the DCN (subsequent to being subjected to training) can be utilized in connection with performing automatic classification/recognition. Pursuant to an example, the DCN 100 can be employed to perform automatic speech recognition (ASR). In another example, the DCN 100 can be employed to perform character recognition (handwriting recognition). In still yet another example, the DCN 100 can be employed to perform facial recognition. In another example, the DCN 100 can be employed to perform classification of text into one or more topics. Other applications for utilization of the DCN 100 will be readily understood by one skilled in the art of automatic classification/recognition.

The DCN 100 comprises a plurality of layered modules 102-104, wherein a number of layered modules in the DCN 100 can vary depending upon application, available computing resources (e.g., processing and memory resources) in a computing apparatus that is utilized to train the DCN 100 and/or utilize the DCN 100 for automatic classification/recognition. For instance, the number of modules may be in the tens, or hundreds, or thousands.

Each of the modules 102-104 can be a neural network with a single hidden layer, wherein a weight matrix in the module, as will be described in greater detail below, can be learned by way of convex optimization. This facilitates training the DCN 100 in a batch-based manner, such that training of the DCN 100 (learning weight matrices for the modules 102-104) can be parallelized across multiple computing devices.

Additionally, each of the modules 102-104 can include a set of linear layers that surround the single hidden layer. The linear layers can include a plurality of input units and a plurality of output units, respectively. The hidden layer comprises a plurality of non-linear units. The input units are mapped to the hidden units with weights defined in one or more weight matrices, and the hidden units are mapped to the output units with weights defined by the desirably learned weight matrix. Learning of the weight matrix that defines weights of connections between the hidden units and output units of a module in the DCN 100 will be described in greater detail below.

With more detail, the first module 102 (the lowest module in the DCN 100) comprises a bottom linear layer 108 that includes a plurality of linear input units, a hidden layer 110 that comprises a plurality of non-linear units, and a top linear layer 112 that comprises a plurality of linear output units. The plurality of linear input units in the first linear layer 108 can correspond to parameters of raw data. For instance, if the DCN 100 is configured to analyze a digital image to recognize characters therein, the raw data may include approximately 800 pixels. Each of the linear input units in the linear layer 108 may correspond to a single pixel in the image, such that the linear layer 108 comprises 800 linear input units. Values of such input units may be intensity values corresponding to the pixels, gradients corresponding to the pixels, or the like. In another example, if the DCN 100 is configured to analyze an audio signal to recognize one or more phones, the raw data may be the audio signal that is sampled into a plurality of separate samples. Accordingly, the number of linear input units in the bottom linear layer 108 may correspond to the number of samples, and values of such input may correspond to certain features of the samples.

The linear input units of the bottom linear layer 108 can be fully connected to the non-linear units in the hidden layer 110 of the first module 102, where a weight matrix $W_{RAN}$ represents weights assigned to connections between the linear input units and the non-linear units. With respect to the first module 102, such weight matrix $W_{RAN}$ can be generated through utilization of a random number generator, wherein values of $W_{RAN}$ are randomly distributed between 0 and 1, e.g., with uniform distribution or Gaussian distribution. Other mechanisms for assigning weights between the input units corresponding to raw training data and non-linear units are contemplated and are intended to fall under the scope of the hereto-appended claims.

The hidden layer 110, as mentioned, comprises the plurality of non-linear units that are configured to perform a non-linear mathematical computation on the weighted values corresponding to the input units. Pursuant to an example, the non-linear units can be sigmoidal units, which can be of the form $\sigma(x)=1/(1+\exp(-x))$, where x is the weighted summation of input units.

The plurality of output units in the top linear layer 112 can be representative of targets for learning. For instance, if the DCN 100 is configured to perform recognition of digits (e.g., 1-10), then the output units in the top linear layer 112 can be representative of the digits 1, 2, 3, and so forth up to 10 (e.g., there are ten output units). In another example, if the DCN 100 is configured to perform recognition of phones, then the output units in the top linear layer 112 can be representative of possible phones.

The plurality of non-linear units in the hidden layer 110 can be fully connected to the plurality of output units in the top linear layer 112, wherein weights of the connections are defined by another weight matrix U, wherein U is desirably learned. For the first module 102, U can be learned based at least in part $W_{RAN}$. More particularly, convex optimization can be utilized in connection with learning U. For instance, a pseudo-inverse operation can be employed to learn U, wherein U=pinv(H)T, where pinv is the pseudo-inverse operation, T represents all the targets in the training set for learning (the supervised output values), H=σ($\Sigma W_{RAN}X$), where X represents all the input values in the training set, and the sigmoid function σ described above is applied element-wise. Values assigned to the output units in the top linear layer 112 can be based at least in part upon the weight matrix U.

As mentioned above, the DCN 100 comprises numerous layered modules—in other words, the output units of the first module 102 are included in a bottom linear layer 114 of the second module 104 as input units. The second module 104 also comprises a hidden layer 116 and a top linear layer 118, which include substantially similar (identical) units as the first module 102. Input units in the bottom linear layer 114 of the second module 102 also include the same input units that correspond to the raw training data that were included in the bottom linear layer 108 of the first module 102. Accordingly, the output units in the top linear layer 112 of the first module 102 are appended to the input units corresponding to the raw data to form the bottom linear layer 114 of the second module 104, and both sets of units can be referred to collectively as input units of the second module 104.

The second module 104 further comprises a single hidden layer 116 that includes a plurality of non-linear units that are fully connected to the input units of the bottom layer 114 of the second module 104. Weights of connections between input units in the bottom linear layer 114 and non-linear units in the hidden layer 116 can be defined be a set of weight matrices: $W_{RAN}$ and $W_{RBM}$, where RBM denotes Restricted Boltzmann Machine. $W_{RAN}$ can serve as the weights of connections between the input units that correspond to the raw data and the plurality of non-linear units in the hidden layer 116, and $W_{RBM}$ are the weights associated with an RBM and can serve as the weights of connections between the input units received from the first module 102 (the output units of the first module 102) and the plurality of non-linear units in the hidden layer 116. Learning of $W_{RBM}$ is described below.

Again, it is desirable to learn the weight matrix U that defines weights of connections between the plurality of non-linear units in the hidden layer 116 of the second module 104 and the plurality of output units in the top linear layer 118. In the case of a non-lowest module in the DCN 100 (any module other than the first module 102), U can be computed based at least in part upon $W_{RAN}$ and $W_{RBM}$. Pursuant to an example, U can be computed as follows: U=pinv(H)t, where H=σ($\Sigma WX$), where T and X have been described above (here X is all input units in the bottom linear layer 114 of the second module), W is the concatenation of $W_{RAN}$ and $W_{RBM}$, and σ($\Sigma WX$)=1/(1+exp(−$\Sigma WX$)) applied element-wise. Values for output units in the top linear layer 118 in the second module 104 can then be computed based at least in part upon the learned U for the second module. These output values may then be included as input units in a bottom linear layer of yet another module. Thus, numerous modules can be layered in this fashion, and U can be learned for each layered module.

Figure 2:
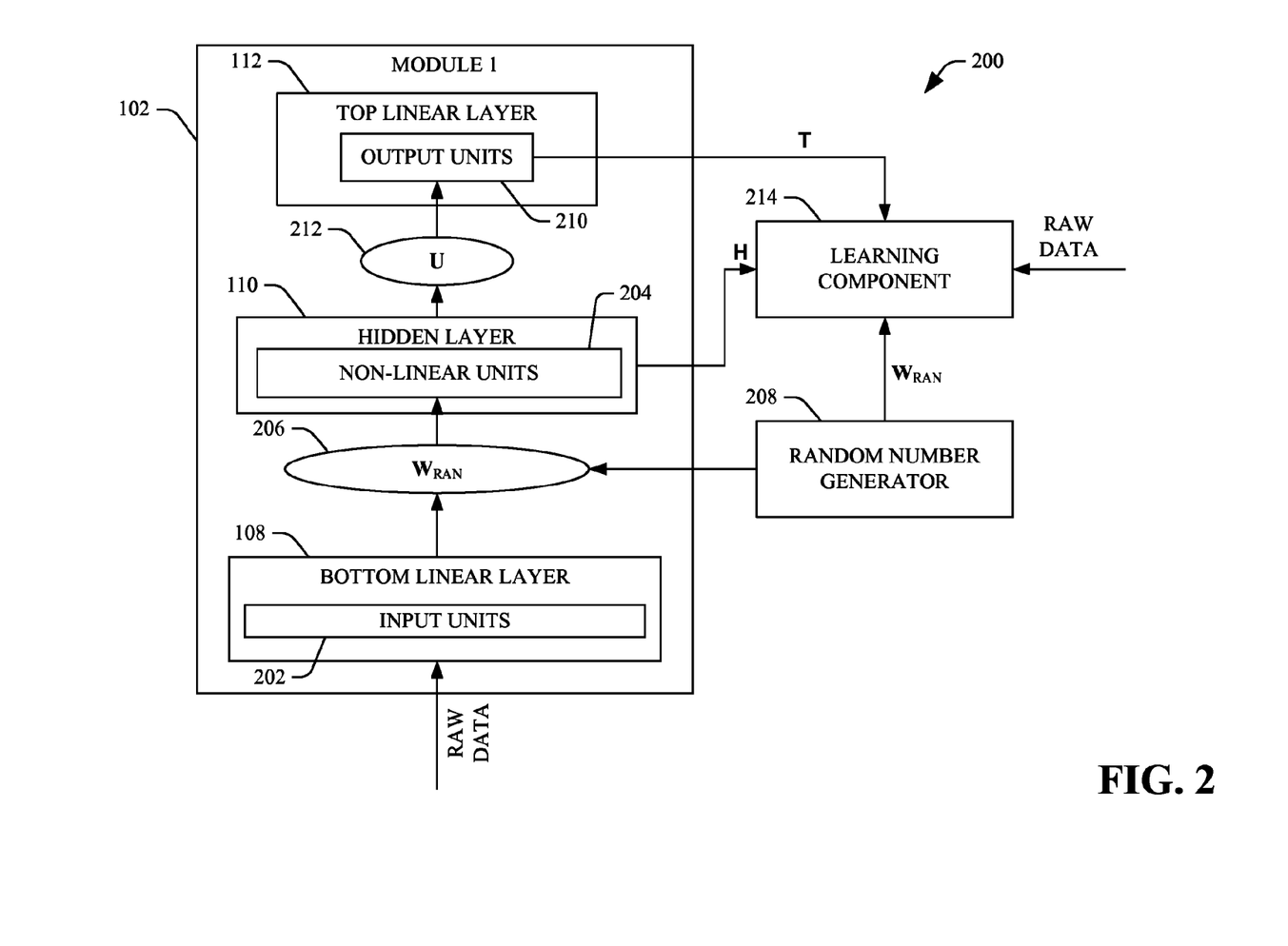
FIG. 2 illustrates an exemplary lowest module in a deep convex network.

Referring briefly to FIG. 2, a system 200 that facilitates learning U for the first module 102 is illustrated. As described above, the first module 104 comprises the bottom linear layer 108, the hidden layer 110, and the top linear layer 112. The bottom linear layer comprises input units 202, which correspond to raw training data as described above. The hidden layer comprises a plurality of non-linear units 204, which may be sigmoidal units. The input units 202 are fully connected to the non-linear units 204. Weights assigned to connections between the input units 202 and the non-linear units 204 are defined by $W_{RAN}$. Pursuant to an example, a random number generator 208 can be configured to generate $W_{RAN}$, wherein values of $W_{RAN}$ can be randomly distributed over a pre-defined range, such as zero to one. The non-linear units 204 perform non-linear computations on values of the input units 202 weighted by the weights in $W_{RAN}$ 206. $W_{RAN}$ may be replaced here partially or fully by $W_{RBM}$.

The top linear layer 112 of the first module 102 comprises a plurality of output units 210 that are fully connected to the non-linear units 204 in the hidden layer 110. As discussed above, it is desirable to learn a weight matrix U 212 for connections between the non-linear units 204 and the output units 210. A learning component 214 can receive $W_{RAN}$ 206 from the random number generator 208 (or from a data store), can receive output computations from the non-linear units 204 h, the values of the input units 202×(the raw training data), identities of the targets for learning t (identities of the output units 210), and can compute U 212 based at least in part thereon through utilization of a convex optimization algorithm. An exemplary convex optimization algorithm has been described above. Values may then be assigned to the output units 210 based at least in part upon the weight matrix U 212. Additionally, while the learning component 214 has been shown as receiving certain data directly from the first module 104, it is to be understood that $W_{RAN}$ 206, x, and t can be known a priori, and the learning component 214 can retrieve such data when needed (immediately subsequent to h being computed by the non-linear units 204).

Figure 3:
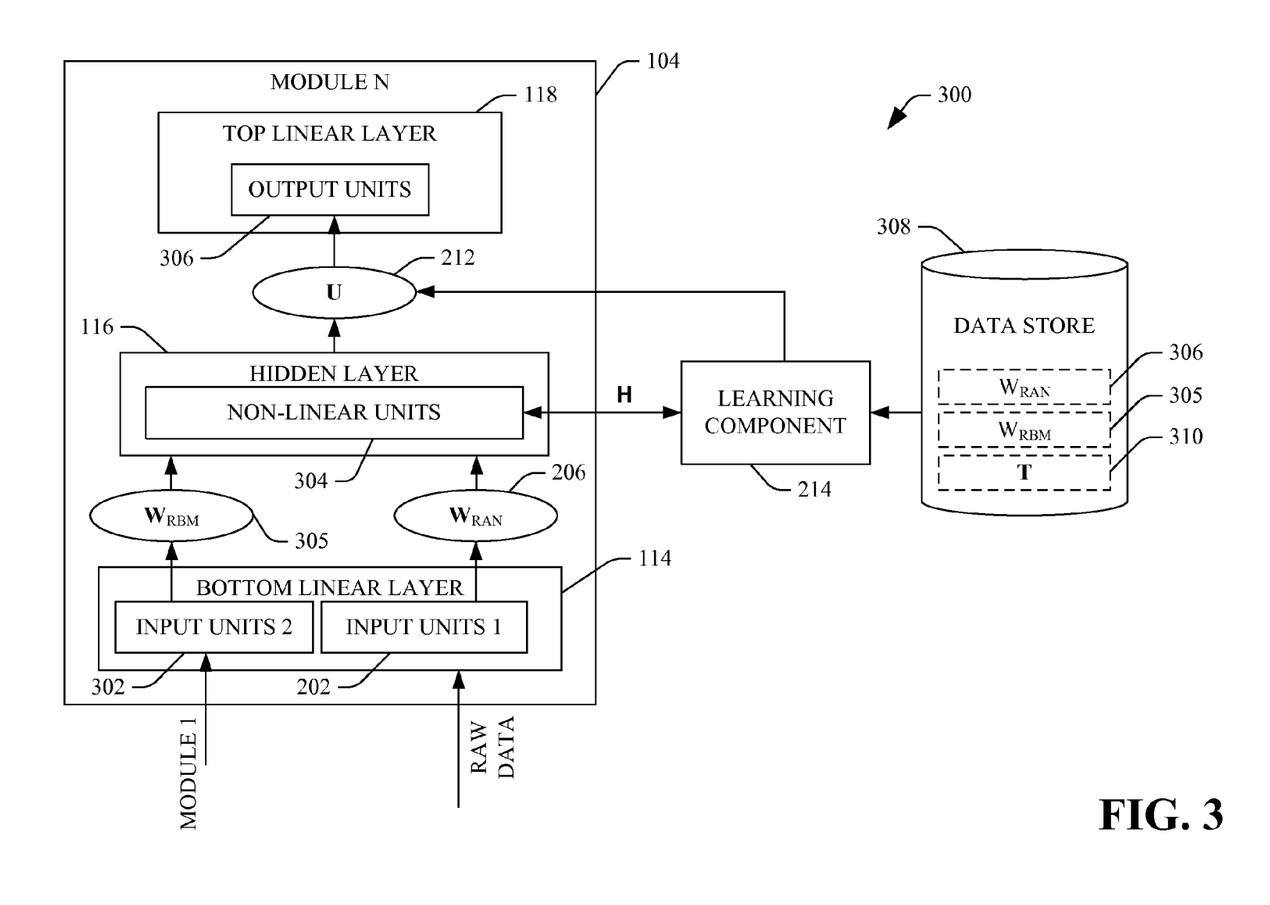
FIG. 3 illustrates an exemplary Nth module in a deep convex network.

Referring now to FIG. 3, an exemplary system 300 that facilitates learning U for the second module 104 is illustrated. While the second module 104 is illustrated in the system 300, it is to be understood that the system 300 can be utilized to learn U for any module in the DCN 100 that is not the lowest module (e.g., the first module 102). The system 300 comprises the second module 104, which includes the bottom linear layer 114, the hidden layer 116, and the top linear layer 118. The bottom linear layer 114 comprises two sets of input nodes: the input units 202 that were also the input units to the first module 102, and a second set of input units 302 that are the output units 210 from the first module 102.

The hidden layer 116 of the second module 104 comprises a plurality of non-linear units 304, which may be substantially similar (e.g., identical) to the non-linear units 204 in the hidden layer 110 of the first module 102. The first set of input units 202 in the bottom linear layer 114 is fully connected to the non-linear units 304 in the hidden layer 116, wherein weights of connections are defined by $W_{RAN}$ 206. Additionally, the second set of input units 302 in the bottom linear layer 114 is also fully connected to the non-linear units 304 in the hidden layer 116, wherein weights of connections are defined by $W_{RBM}$ 305, which can be pre-computed in a pre-training phase. Computation of $W_{RBM}$ 305 for the second set of input units 302 will now be described.

A pair of layers in a module of the DCN 100 can be treated as a Restricted Boltzmann Machine (RBM). With more detail, an RBM is a particular type of Markov random field (MRF) that has one layer of (typically Bernoulli) stochastic hidden units and one layer of (typically Bernoulli or Gaussian) stochastic visible units. RBMs can be represented as bipartite graphs since all visible units are connected to all hidden units, but there are no visible-visible or hidden-hidden connections.

In the RBMs, the joint distribution p (v, q; θ) over the visible units v and hidden units q, given the model parameters θ, can be defined in terms of an energy function E (v, q; θ) of the following algorithm:

$$p(v, q; \theta) = \frac{\exp(-E(v, q; \theta))}{Z}, \quad (1)$$

where $Z=\Sigma_v\Sigma_q \exp(-E(v, q; \theta))$ is a normalization factor or partition function, and the marginal probability that the model assigns to a visible vector v can be defined as follows:

$$p(v; \theta) = \frac{\sum_q \exp(-E(v, q; \theta))}{Z} \quad (2)$$

For a Bernoulli (visible)-Bernoulli (hidden) RBM, the energy is as follows:

$$E(v, q; \theta) = -\sum_{i=1}^{V}\sum_{j=1}^{Q} w_{ij} v_i q_j - \sum_{i=1}^{V} b_i v_i - \sum_{j=1}^{Q} a_j q_j, \quad (3)$$

where $w_{ij}$ represents the symmetric interaction term between visible unit $v_i$ and hidden unit $q_j$, $b_i$ and $a_j$ represent the bias terms, and V and Q are the numbers of visible and hidden units. The conditional probabilities can be calculated as follows:

$$p(q_j = 1 \mid v; \theta) = \sigma\left(\sum_{i=1}^{V} w_{ij} v_i + a_j\right) \quad (4)$$

$$p(v_i = 1 \mid a; \theta) = \sigma\left(\sum_{j=1}^{Q} w_{ij} h_j + b_i\right), \quad (5)$$

where $\sigma(x)=1/(1+\exp(-x))$.

Similarly, for a Gaussian-Bernoulli RBM, the energy is as follows after assuming that the variance is unity:

$$E(v, q; \theta) = -\sum_{i=1}^{V}\sum_{j=1}^{Q} w_{ij} v_i q_j + \frac{1}{2}\sum_{i=1}^{V} (v_i - b_i)^2 - \sum_{j=1}^{Q} a_j q_j, \quad (6)$$

The corresponding conditional probabilities become:

$$p(q_j = 1 \mid v; \theta) = \sigma\left(\sum_{i=1}^{V} w_{ij} v_i + a_j\right) \quad (7)$$

$$p(v_i \mid q; \theta) = N\left(\sum_{j=1}^{Q} w_{ij} q_j + b_i, 1\right) \quad (8)$$

where $v_i$ can take real values and can follow a Gaussian distribution with mean $$\sum_{j=1}^{Q} w_{ij} q_j + b_i$$

and variance of one. Gaussian-Bernoulli RBMs can be used to convert real-valued stochastic variables to binary stochastic variables which can then be further processed using the Bernoulli-Bernoulli RBMs.

Following the gradient of the log likelihood log p (v;θ) the update rule for the weights can be obtained as follows:

$$\Delta w_{ij} = \langle v_i q_j \rangle_{data} - \langle v_i q_j \rangle_{model}, \quad (9)$$

where $\langle v_i q_j \rangle_{data}$ is the expectation observed in the training data and $\langle v_i q_j \rangle_{model}$ is that same expectation under a defined distribution for the DCN 100. Unfortunately, $\langle v_i q_j \rangle_{model}$ can be extremely expensive to compute exactly so the contrastive divergence (CD) approximation to the gradient may be used where $\langle v_i q_j \rangle_{model}$ is replaced by running a Gibbs sampler initialized at the data for one full step.

From a decoding point of view, the DCN 100 can be treated as a multi-layer perceptron with many layers. The input signal (from the training data) can be processed layer by layer through utilization of equation (4) until the final layer. The final layer can be transformed into a multinomial distribution using the following softmax operation:

$$p(l = k \mid q; \theta) = \frac{\exp\left(\sum_{i=1}^{Q} \lambda_{ik} q_i + a_k\right)}{Z(q)}, \quad (10)$$

where l=k denotes the input been classified into the k-th class, and $\lambda_{ik}$ is the weight between hidden unit $q_i$ at the last layer and class label k.

Pursuant to an example, frame-level data can be used train a stack of RBMs in a generative manner, resulting in output of $W_{RBM}$ 305. $W_{RBM}$ 305 may then be employed as a weight matrix for each full connection of input units that are obtained from a lower module in the DCN 100.

Accordingly, the non-linear units 304 can receive values from the second set of input units 302 that are weighted by $W_{RBM}$ 305. Based at least in part upon the first set of input units 202 and the second set of input units 302 as weighted by $W_{RAN}$ 206 and $W_{RBM}$ 305, respectively, the non-linear units 304 in the hidden layer 116 can compute H. As has been described above, the non-linear units 304 are fully connected to a plurality of output units 306 in the top linear layer 118 of the second module, wherein such output units 306 are representative of targets for learning. It is desirable to learn the weight matrix U that defines weights of connections between the plurality of non-linear units 304 and the plurality of output units 306.

The learning component 214 is configured to compute U 212 for the second module 104 based at least in part upon $W_{RAN}$ 206, $W_{RBM}$ 305, X (the values of the first set of input units 202 and the second set of input units 302), T, and H. Pursuant to an example, the system 300 may comprise a data store 308 that includes $W_{RAN}$ 206, $W_{RBM}$ 305, and T 310, as these values can be pre-computed or known. A portion of X (the first set of input units 202) can also be retained in the data store 308, as such values are static, while the remainder of x can be received from the immediately lower module in the DCN 100. Based at least in part upon these values, the learning component 214 can compute U by way of convex optimization as described above.

Figure 4:
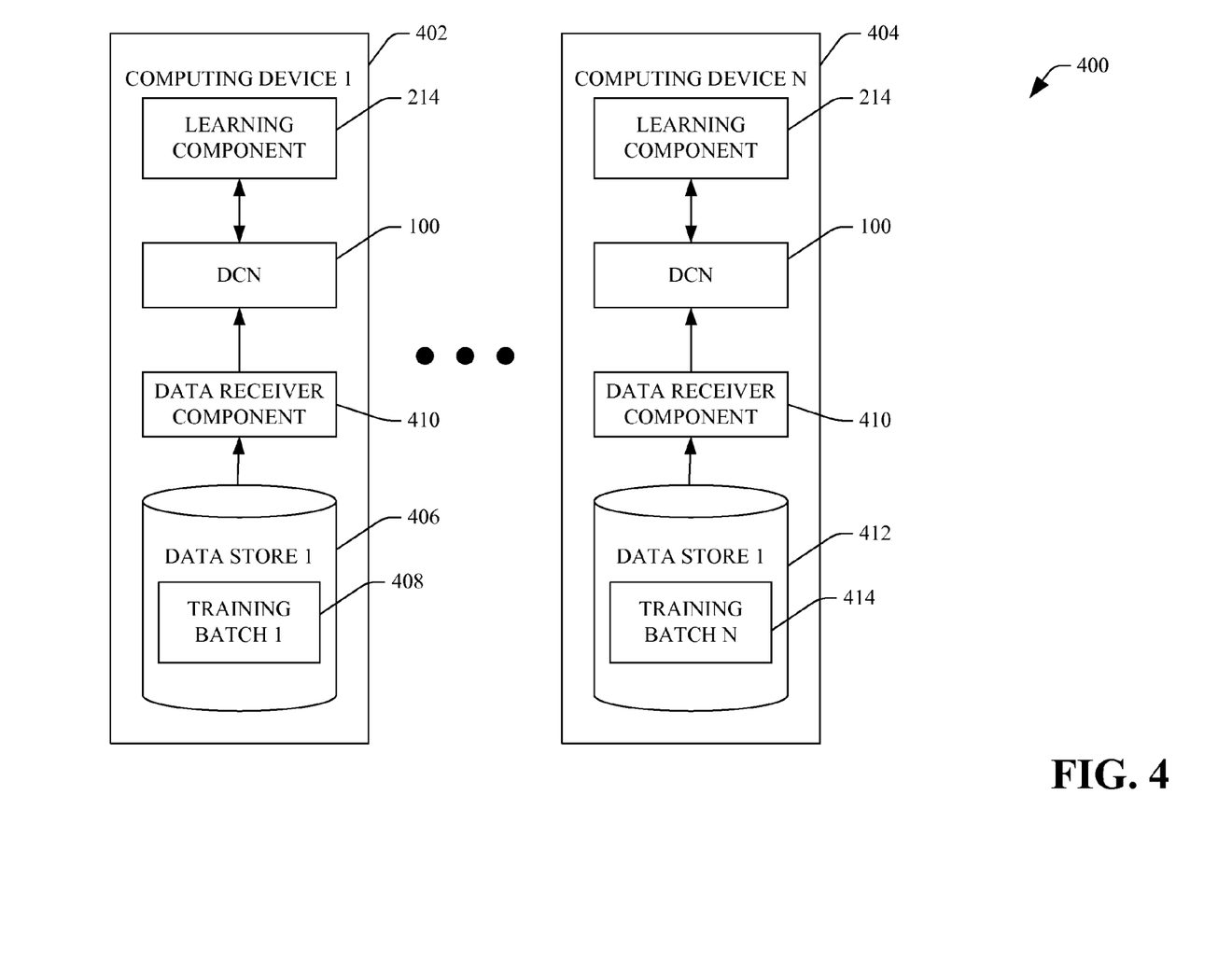
FIG. 4 is a functional block diagram of an exemplary system that facilitates learning weight matrices in a deep convex network through parallel computation.

Now referring to FIG. 4, an exemplary system 400 that facilitates learning U for various modules in the DCN 100 through utilization of parallel computing is illustrated. The system 400 comprises a plurality of computing devices 402-404. Each of the computing devices 402-404 can have an instance of the DCN 100 loaded thereon. A first computing device 402 can include a first data store 406 that comprises a first training batch 408. The first training batch can include a significant amount of training data. A data receiver component 410 can receive data from the first training batch 408, and provides the training to a first instance of the DCN 100. The learning component can learn U for modules in the DCN 100 layer by layer, until U for all modules have been obtained.

The Nth computing device 404 comprises an Nth data store 412 that includes an Nth training batch 414. The data receiver component 410 receives data from the Nth training batch 414 in the data store 412 and provides such training data to the instance of the DCN 100 on the Nth computing device 404. The learning component 214 can learn U for all modules in the Nth instance of the DCN 100. Accordingly, batch-mode processing can be undertaken in parallel across numerous computing devices, since the learning component 214 utilizes a convex optimization function to learn U. Final values for U may be set later in time as a function of values of U learned by the learning component 214 for the instances of the DCN 100 across the computing devices 402-404.

Figure 5:
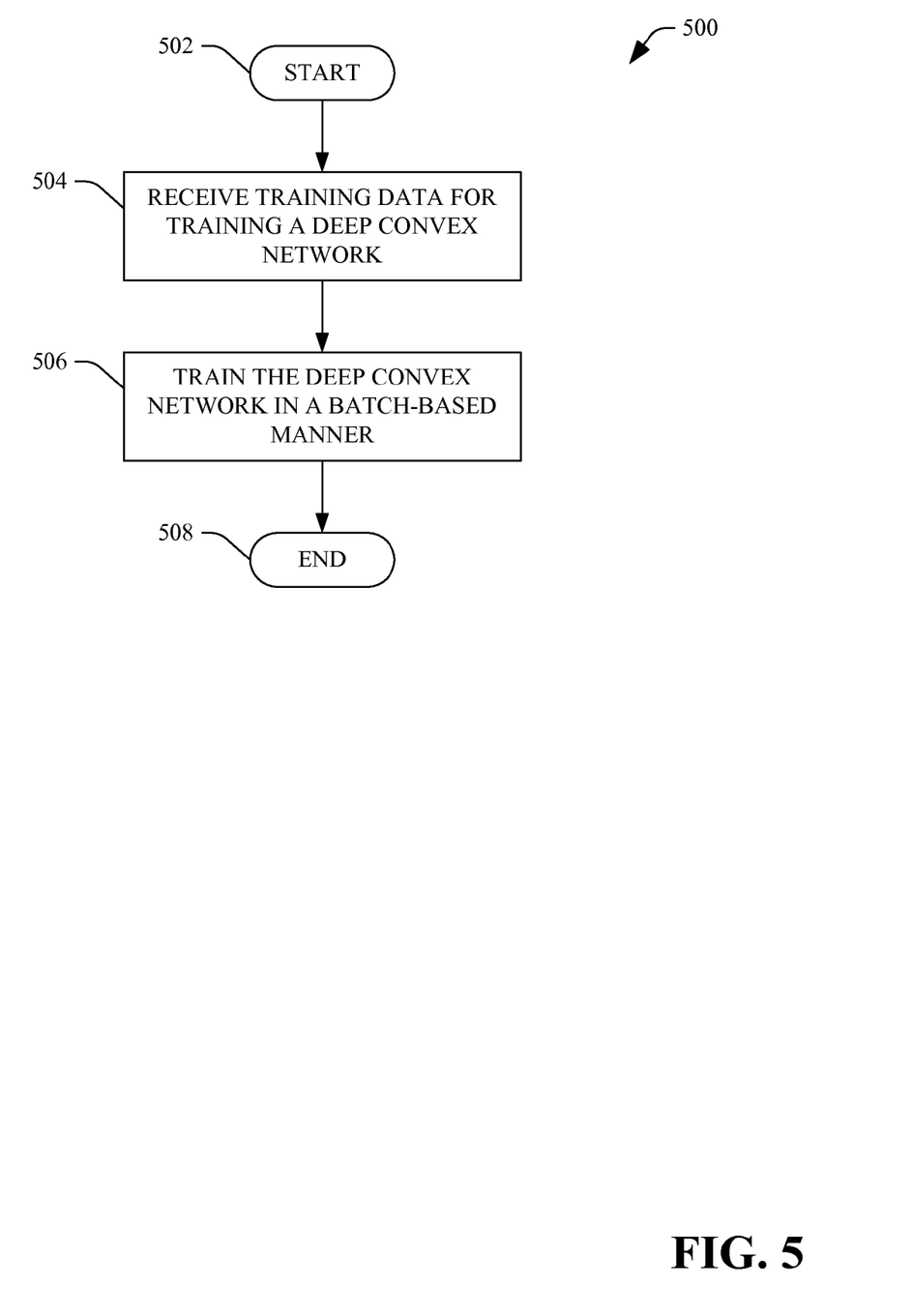
FIG. 5 is a flow diagram that illustrates an exemplary methodology for training a deep convex network in a batch-based manner.
Figure 6:
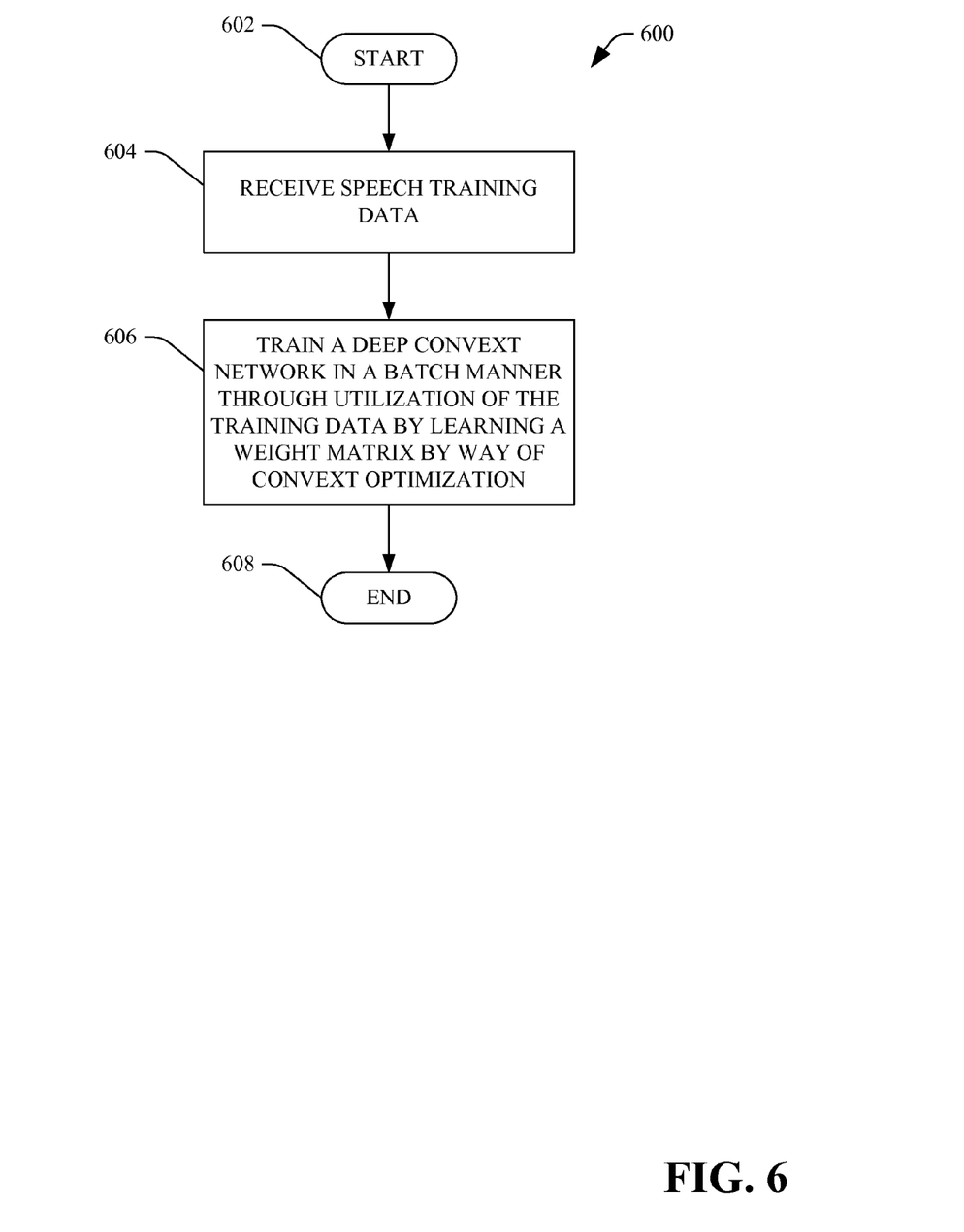
FIG. 6 is a flow diagram that illustrates an exemplary methodology for learning matrix weights in a deep convex network by way of convex optimization.

With reference now to FIGS. 5-6, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

With reference now to FIG. 5, an exemplary methodology 500 that facilitates training a DCN in a batch-based manner is illustrated. The methodology 500 starts at 502, and at 504 training data for training a deep convex network is received. As described above, the deep convex network comprises a plurality of interconnected modules, and each module includes at least one linear layer and at least one non-linear (hidden) layer. At 506, the deep convex network is trained in a batch-based manner based at least in part upon the training data, wherein training the deep convex network comprises learning a weight matrix corresponding to output of the non-linear layer of at least one module in the plurality of interconnected modules. The methodology 500 completes at 508.

Now turning to FIG. 6, an exemplary methodology 600 that facilitates learning a plurality of weight matrices by way of convex optimization is illustrated. The methodology 600 starts at 602, and at 604 speech training data is received. At 606, a deep convex network is trained in a batch manner through utilization of the training data, wherein the deep convex network comprises a plurality of layered modules that each include a one-hidden-layer neural network. A hidden layer in a first module includes a plurality of non-linear units that are interconnected to a plurality of linear input units in a linear layer of a second module. Training the deep convex network includes learning a plurality of weight matrices corresponding to the plurality of layered modules, such that a weight matrix is learned for each layered module, and wherein the weight matrix is learned by way of convex optimization. The methodology 600 completes at 608.

Figure 7:
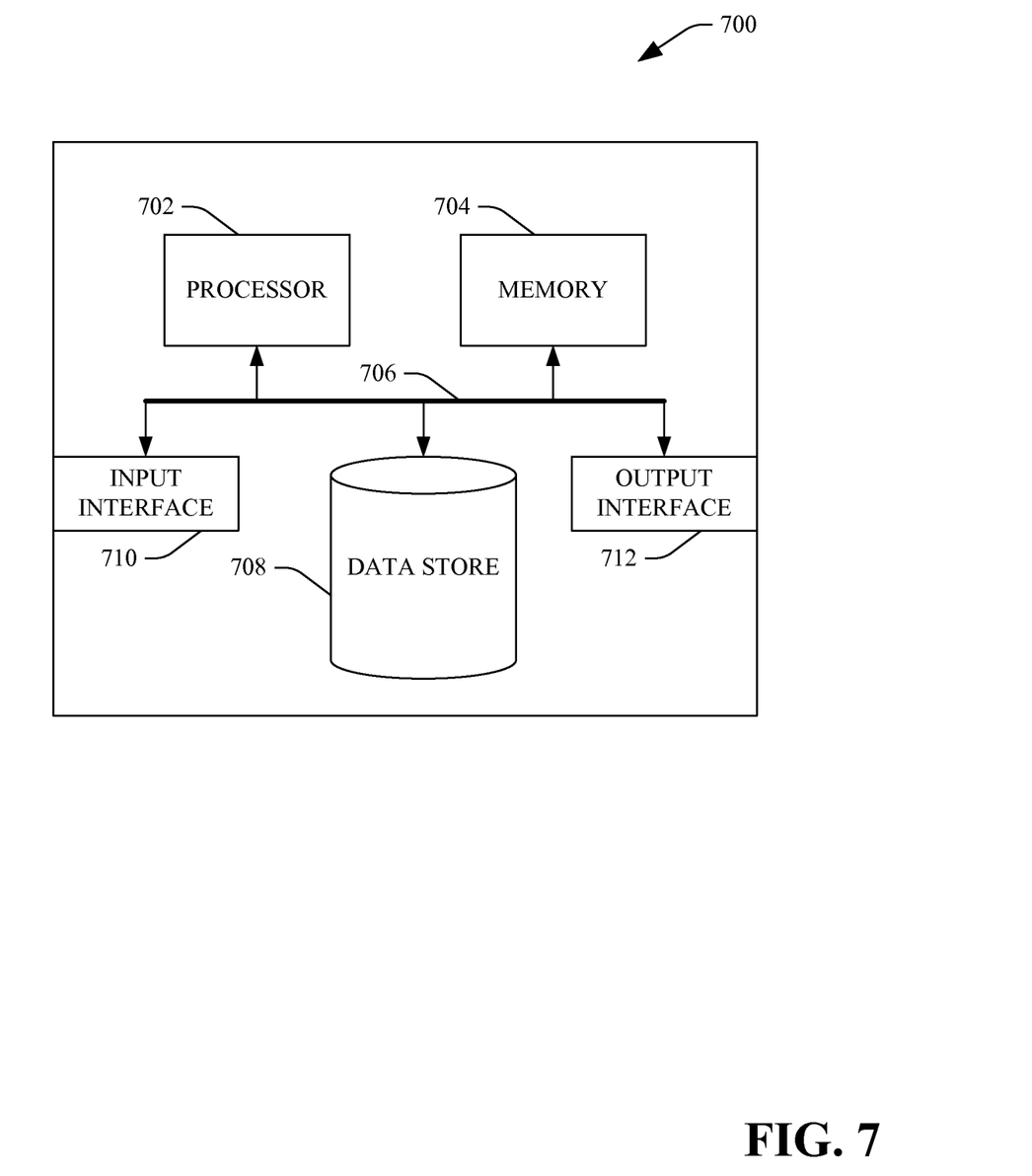
FIG. 7 is an exemplary computing system.

Now referring to FIG. 7, a high-level illustration of an exemplary computing device 700 that can be used in accordance with the systems and methodologies disclosed herein is illustrated. For instance, the computing device 700 may be used in a system that supports ASR. In another example, at least a portion of the computing device 700 may be used in a system that supports learning weight matrices in a DCN by way of convex optimization. The computing device 700 includes at least one processor 702 that executes instructions that are stored in a memory 704. The memory 704 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store a training data set, a validation data set, a DCN, etc.

The computing device 700 additionally includes a data store 708 that is accessible by the processor 702 by way of the system bus 706. The data store 708 may be or include any suitable computer-readable storage, including a hard disk, memory, etc. The data store 708 may include executable instructions, a DCN, a training data set, a validation data set, weight matrices, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving training data for training a deep convex network that comprises a plurality of interconnected modules, wherein each module in the plurality of interconnected modules comprises a linear layer and a non-linear layer; and
   training a portion of the deep convex network in a batch-based manner based at least in part upon the training data, wherein training the deep convex network comprises learning a weight matrix corresponding to output of the non-linear layer of at least one module.

2. The method of claim 1 configured for execution across a plurality of computing devices.

3. The method of claim 1, wherein each module is a single-hidden layer neural network.

4. The method of claim 3, wherein a hidden layer in the single-hidden layer neural network comprises a plurality of sigmoidal units.

5. The method of claim 1, wherein the deep convex network comprises a lowest module, and wherein input to the lowest module is raw training data.

6. The method of claim 5, wherein the deep convex network comprises a higher module that is interconnected with the lowest module, and wherein input to the higher module comprises output of the lower module appended with the raw training data.

7. The method of claim 6, wherein a first weight matrix pertaining to connections between units in the linear layer that correspond to the raw training and units in the non-linear layer in the higher module comprises random numbers generated by a random number generator.

8. The method of claim 7, wherein a second weight matrix pertaining to connections between units in the linear layer that correspond to output units from the lowest module and the units in the non-linear layer in the higher module comprises weights of separately trained Restricted Boltzmann Machines.

9. The method of claim 8, wherein a third weight matrix pertaining to connections between units in the non-linear layer and output units of the higher module is learned by way of convex optimization.

10. The method of claim 9, wherein an algorithm utilized to perform the convex optimization is U=pinv(H)T, where H=σ(ΣWX), where T represents supervised output values in the training data, W is a weight matrix between the input modules and units in the non-linear layer, and X represents the input units corresponding to the raw training data, and wherein σ(ΣWX)=1/(1+exp(−ΣWX)) applied element-wise.

11. The method of claim 1, wherein the training data is speech data.

12. The method of claim 1, wherein the training data is image data.

13. A system comprising:
    a processor; and
    a memory that comprises a plurality of components that are executable by the processor, the plurality of components comprising:
       a data receiver component that receives training data; and
       a training component that trains a deep convex network in a batch-training manner based at least in part upon the training data, wherein the deep convex network comprises a plurality of interconnected modules that each include a linear layer that comprises a plurality of input units and a non-linear layer that comprises a plurality of hidden units, wherein input units of a first module include units output by the plurality of hidden units in a second module.

14. The system of claim 13, wherein the training component learns a first weight matrix corresponding to the plurality of hidden units of the first module and the plurality of hidden units of the first module through utilization of convex optimization.

15. The system of claim 14, wherein the training data is speech data.

16. The system of claim 14, wherein the training data is image data.

17. The system of claim 14, wherein the first weight matrix is based at least in part upon a second weight matrix that has been assigned to connections between input units of the first module and hidden units of the first module.

18. The system of claim 17, wherein the second weight matrix comprises a plurality of randomly generated numbers.

19. The system of claim 17, wherein the second weight matrix comprises weights obtained by training RBMs.

20. A computer-readable medium comprising instructions that, when executed by a processor, cause the processor to perform acts comprising:
    receiving speech training data;
    training a deep convex network in a batch manner through utilization of the training data, wherein the deep convex network comprises a plurality of layered modules that each include a one-hidden-layer neural network, wherein a hidden layer in a first module comprises a plurality of hidden units that are interconnected to a plurality of input units in a linear layer of a second module, wherein training the deep convex network comprises:
       learning a plurality of weight matrices corresponding to the plurality of layered modules, such that a weight matrix is learned for each layered module, and wherein the weight matrix is learned by way of complex optimization.

* * * * *